United States Patent [19]

Maddern et al.

[11] Patent Number: 4,912,700
[45] Date of Patent: Mar. 27, 1990

[54] TELECOMMUNICATIONS DIGITAL SWITCH

[75] Inventors: Thomas S. Maddern; Geoffrey Chopping, both of Dorset, England

[73] Assignee: The Plessey Company plc, Ilford, England

[21] Appl. No.: 265,821

[22] Filed: Nov. 1, 1988

[30] Foreign Application Priority Data

Nov. 13, 1987 [GB] United Kingdom ............... 8726677

[51] Int. Cl.⁴ ............................................ H04Q 11/04
[52] U.S. Cl. .................................................. 370/58.2
[58] Field of Search ..................... 370/58, 63, 64, 59; 340/825.7, 825.8; 379/248

[56] References Cited

U.S. PATENT DOCUMENTS 4,400,627  6/1983  Zola ................................. 340/825.8
4,566,094  1/1986  Ardon et al. ........................... 370/63

OTHER PUBLICATIONS

IEE Conference Proceedings, Pub. No. 300; IEE Second National Telecommunications Conference; York, England; Apr. 2-5 89, pp. 321-326.

GEC Plessey Telecomm. Ltd.; "Analysis of Multi-Slot Connections", T. S. Maddern, Slides 1-17.

Primary Examiner—Joseph A. Orsino
Assistant Examiner—Frank M. Scutch, III
Attorney, Agent, or Firm—Fleit, Jacobson, Cohn, Price, Holman & Stern

[57] ABSTRACT

In order to permit multislot connections to be simply made across a telecommunications digital switch, so that all the slots of the multislot connection experience the same whole frame time delay, the switch is constructed as input and output switch stages each comprising arrays of digital switching modules (DSM) and a central switching area comprising two arrays of Demultiplexing/Mixing/Remultiplexing devices (DMR) interconnected by an array of digital switching modules (DSM), wherein each DMR has a transfer function such that a channel (p) in a time frame of (q) channels on an input line (r) appears on an output line (s) which is related to the input line by means of a backward rotate function, where s=MOD (q−r+p), where MOD=modulo q. This construction of switch ensures that all channels routed through the switch have one of only two possible values of whole frame time delay, thereby simplifying the setting up of a multislot connection.

8 Claims, 13 Drawing Sheets

TELECOMMUNICATIONS DIGITAL SWITCH

FIELD OF THE INVENTION

This invention relates to a telecommunications digital switch employing a multiplicity of switching stages for selectively switching time multiplexed channels on each of a plurality of input paths to time multiplexed channels on each of a plurality of output paths.

DESCRIPTION OF THE RELATED ART

In out British Pat. No. 20833319 there is disclosed digital switching modules for selectively switching any channel on m TDM incoming paths each carrying n digital channels to any channel on m TDM outgoing paths each having n digital channels including a control store and a data store, the data store being adapted to receive and store in a cyclic manner the time division multiplex information stream incoming to the module, the control store being adapted to be read cyclically in synchronism with the channel appearance on the outgoing paths and each location of the control store is adapted to store the identity of the data store location to be connected to the corresponding output path and channel. Such digital switching modules will hereinafter be referred to as DSM.

In view of lengthy time delays created when multiple stages of DSM are employed to provide high volume switching, switch units known as Demultiplexing/Mixing/Remultiplexing devices have been employed comprising n input paths and n output paths for connection in interstage links of a multi-stage telecommunication switching network handling time division multiplexed communication paths and using digital switching modules, wherein the device comprises n multiplexors each having one output and n inputs and each multiplexor providing one discrete output path for the device and each input path is connected to a corresponding input path on each multiplexor and the multiplexors of the device are adapted to be controlled to connect a selected input path to the corresponding output path in accordance with address information fed to the multiplexors from a cyclic address generator in the device and the cyclic address generator is preprogrammed with a fixed channel allocation address pattern arranged such that the channels on each input path are distributed equally over the output multiplexors without changing the position of the channels within a multiplex. Such devices are the subject of our British Patent No. 2074815, and will hereinafter be referred to as DMR.

Such DMR are commonly arranged as for example in FIG. 15 of Pat. No. 2074815 in multi-stage switches having an input switching stage, a central switching stage and an output switching stage, the input and output stages comprising arrays of DSM for switching a desired input channel to a desired output channel, and the central stage comprising first and second arrays of DMR interconnected by an array of DSM.

A problem arises when high bandwidth services are to be provided across the switching network. With the advent of optical fibre transmission, services such as video transmission services requiring bandwidths of 2048 kbits$^{-1}$ become a practical possibility. These services require use of multiple channels within each TDM frame, known as multi-slot connections. It is necessary to ensure that all channels of such multi-slot connections experience the same delay during propagation or else undesirable phase shift problems occur. In particular it is necessary to ensure that all channels of a set of channels of a multi-slot connection switched through a multi-stage switch network as described above are subject to delays which are such that channels entering the switch in the same frame leave the switch still all within the same time frame, even though the set of channels may be subject to an overall delay of one or more time frames.

SUMMARY OF THE INVENTION

The present invention is based on the recognition that it is possible to route a large number of channels of a time frame through a multi-stage switch network with all such channels experiencing a delay amounting to a small number of whole frame lengths so that the channels remain within the same time frame even though subject to an overall delay of zero or one or more frames.

In one aspect, the invention provides a telecommunications digital switch for switching channels of time division mutliplexed (TDM) signals on a multiplicity of switch input and output paths, the switch comprising:
input and output switching stages and a central switching area:
the input and output switch stages each comprising arrays of DSM (as herein defined);
the central switching area comprising first and second arrays of DMR (as herein defined), wherein the DMR are so preprogrammed with a channel allocation address pattern that all channel routes through the central switching stage experience the same time delay;
the arrangement being such that all or a major part of the channel routes through the switch are constrained to have delays such that all channels are displaced to positions within (n) or (n+1) subsequent time frames of the TDM system where (n) is an integer, selected from the range 0, 1, 2.

In a further aspect, the invention provides a telecommunications digital switch for switching channel of time division mutliplexed (TDM) signals on a multiplicity of switch input and output paths, the switching comprising:
(2a+1) switching stages where (a) is a integer;
each odd ordered switch stage in the sequence of stages comprising arrays of DSM (as herein defined);
each even ordered stage in the sequence of stages comprising arrays of DMR (as herein defined) wherein the DMR are so preprogrammed with a channel allocation address pattern path all channel routes through the respective switching stage experience the same time delay;
the arrangement being such that all or a major part of channel routes through the switch are constrained to have delays such that all channels are displaced to positions within a sequence of (a) subsequent time frames or any subsequent time frame.

In a further aspect, the invention provides a time division multiplex channel redistribution device having n input paths and n output paths for connection in interstage links of a multi-stage telecommunications switching network handling time division multiplexed communications paths and using digital switching modules, wherein the device comprises n multiplexors each having one output and n inputs and each multiplexor provides one discrete output path for the devise and each input path is connected to a corresponding input path on each multiplexor and the multiplexors of the device are adapted to be controlled to connect a selected input path of the corresponding output path in accordance with address information fed to the multiplexors form a cyclic address generator in the device and the cyclic address generator is preprogrammed with a fixed channel on each input path are distributed equally over the output path multiplexers without changing the position of the channels within a multiplex, whereby to provide a transfer function of the device where a time slot p (numbered from zero) in a time frame of q slots appearing on an input line r (numbered from zero), appears on an output line s (numbered from zero), such that:

$$s = MOD\ (q - r + p),$$

where MOD = Modulo q

BRIEF DESCRIPTION OF THE DRAWING

A preferred embodiment of the invention will now be described with reference to the accompanying drawings, wherein:

FIG. 5 is a chart of the transfer function of a DMR;

DESCRIPTION OF THE PREFERRED EMBODIMENTS

With the advent of optical fibre digital transmission links providing virtually unlimited bandwidth, services requiring more than 64 kbits−1 become a practical proposition. Typical examples are high definition TV, video conferencing, high quality audio, and high bandwidth computer links. Although some of these require the use of complete high speed circuits such as 140 Mbits−1, which may not conform to standard transmission multiplex structures, an increasing number of services can be handled on a standard CCITT 2048/1544 Kbits·−1 TDM structure with the link occupying several or all of the channels within each time frame.

To ease the design of terminals which support such multislot services the connections across the network must maintain both bit and time slot integrity. For these transmission networks it is necessary for all the time slots to be carried on one 2048/1544 kbits−1 multiplex so that identical propagation and synchronising frame buffering delays are encounted. If greater bandwidths are required, then synchronous higher order multiplex structures are employed. The definition of asynchronous multiplexes allows for freedom in the timing which is incompatible with maintaining identical frame buffering delays.

The main area of concern is the delay across the switching nodes of the network, comprising digital switches as set forth above. Multiple stage digital switches employing time switching techniques generally encounter difficulties when used for multiple channel paths, which are required to be carried with the same delay. The degree of difficulty increases with number of time switching stages. Reconfiguration of the interstage links for efficient growth of switch size may complicate further the analysis of switched path delay.

A digital switch is described below employing three time switching stages. Although the examples are based on 2048 kbits−1 multiplex structures, the same analysis can be applied to 1544 kbits−1 multiplexes. This delay analysis can readily be applied more generally to other multi-stage switching structures such as T-S-T. By combining VLSI technology with an efficient switch architecture, a very compact implementation can be produced, being about a factor of 5 to 10 smaller than present conventional T-S-T designs.

Figure 1:
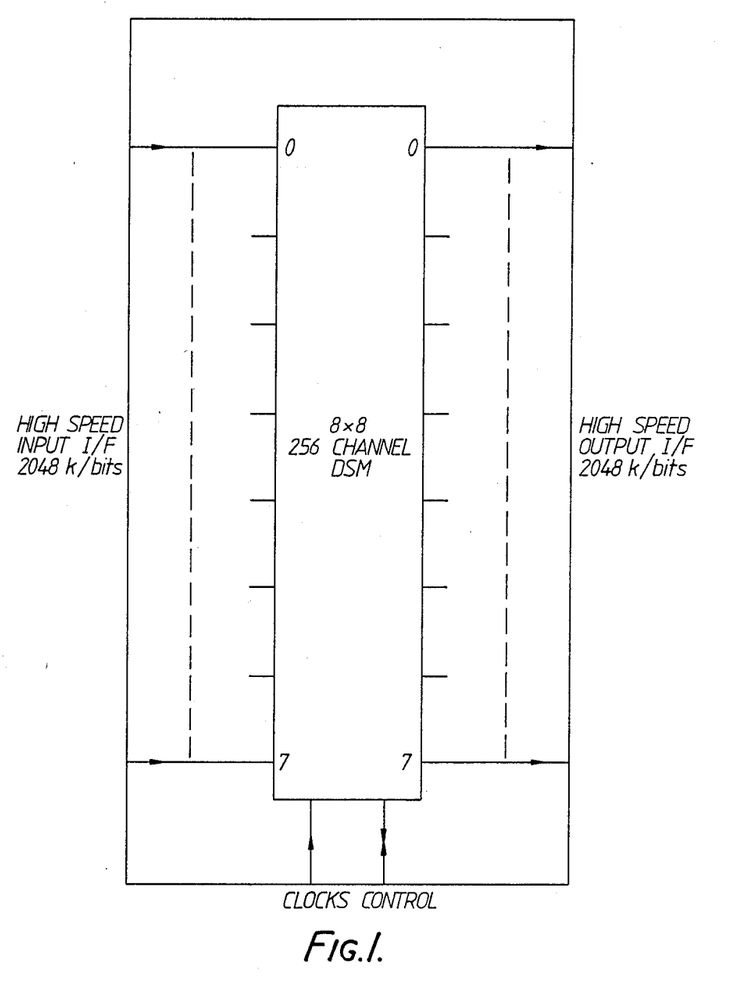
FIG. 1 is a representation in block-diagram form of a DSM.
Figure 2:
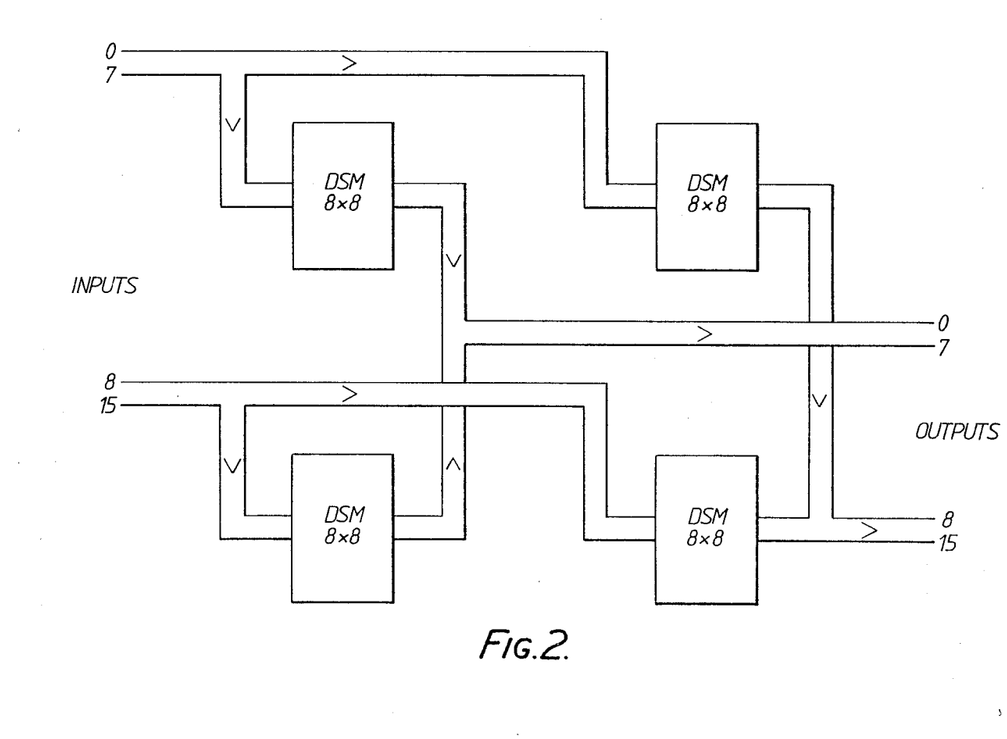
FIG. 2 is a block diagram of an array of DSM providing a 16×16 switch.

The switch to be described employs DSM, which provide full availability non-blocking switching for 256 channels, operating internally as a time switch. The traffic connections are configured as 8 serial lines in and out as shown in FIG. 1, each of which is directly compatible with the standard CCITT 2048 kbits−1 PCM multiplex. This switch can be considered as an 8 by 8 switch at 2048 kbits−1. Multiple DSM can be connected together in a square array to form larger capacity single stage switches such as 16 by 16 or asymmetric configurations such 8 by 16 by 8 as shown in FIG. 2.

A three stage switch structure is required to efficiently implement the 64 to 2048 traffic port (2048 kbits/s) size range of the digital switches used in System X. Due to the requirement to meet CCITT standards on propagation delay, it is not possible to use double buffered time switching. Further doubling the speech store capacity would have made implementation of the DSM switching device more difficult.

Figure 3:
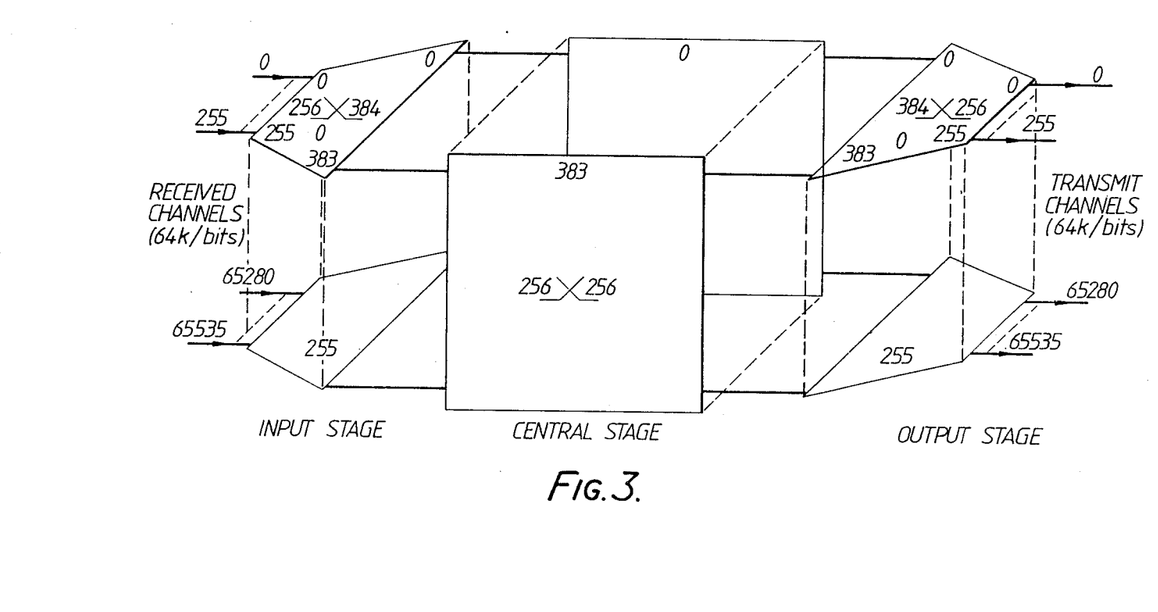
FIG. 3 is a block diagram of the architecture of a 3-stage switching network.
Figure 4:
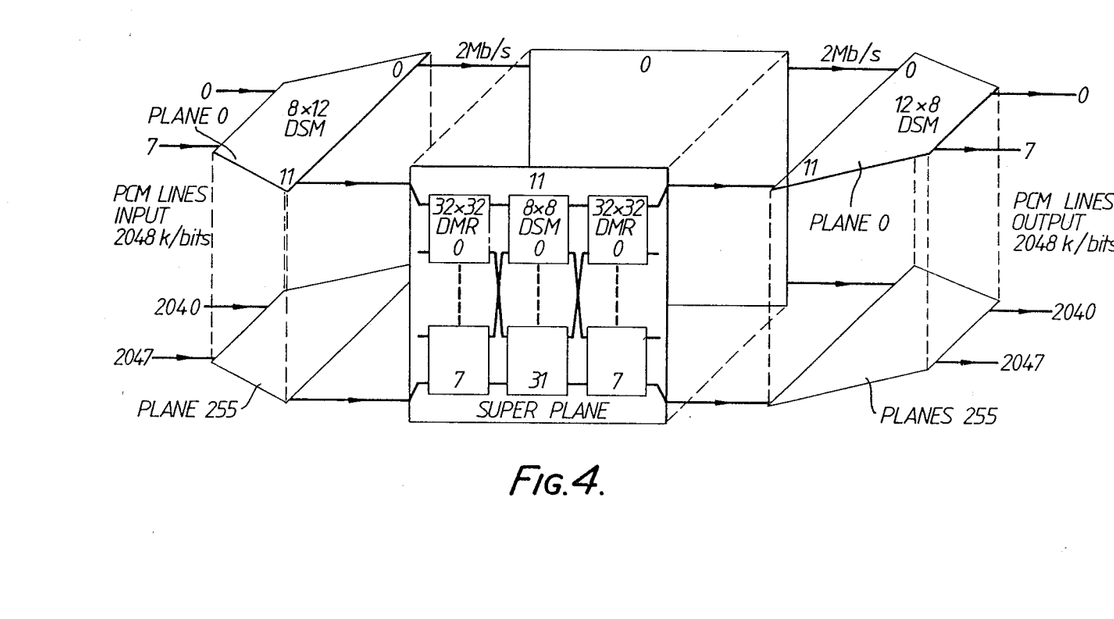
FIG. 4 is a more detailed block diagram of the network of FIG. 3.

A conceptual picture of the switch architecture is given in FIG. 3 in terms of the 64 kbits/s channel switching. There is a 50% increase of circuit paths in the central stage to provide an essentially non-blocking full availability structure. The switch is implemented using DSM as shown in FIG. 4. Since the DSM multiplexes the 64 kbits/s channels (time slots) onto 8 input and 8 output lines an extra level of channel manipulation is required between the outer stages and the central DSM. DMR is used for this purpose carrying out the necessary demultiplexing mixing and remultiplexing function. It operates entirely within the space domain as shown by its transfer funciton in FIG. 5 and requires no control during switched path set up. The 8 by 12 and 12 by 8 switch structures for the outer stages are actually constructed using 2 DSM each which give 8 by 16 and 6 by 8 switching arrays. The extra inputs and outputs are not used. The type of switch shown in FIG. 4 is described more fully in our British Patents UK-B-2074615 and UK-B-2130049.

Figure 6:
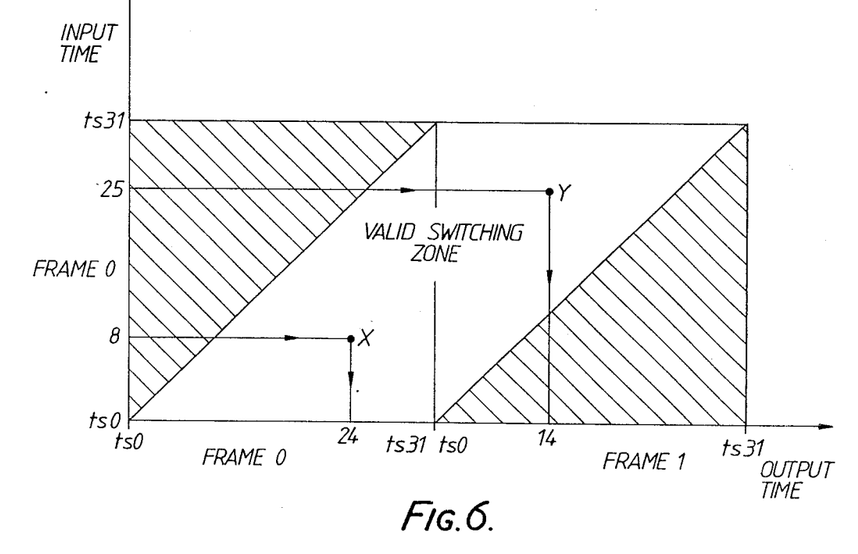
FIG. 6 is a diagram of the time delay arising across a stage of a switching network.
Figure 7:
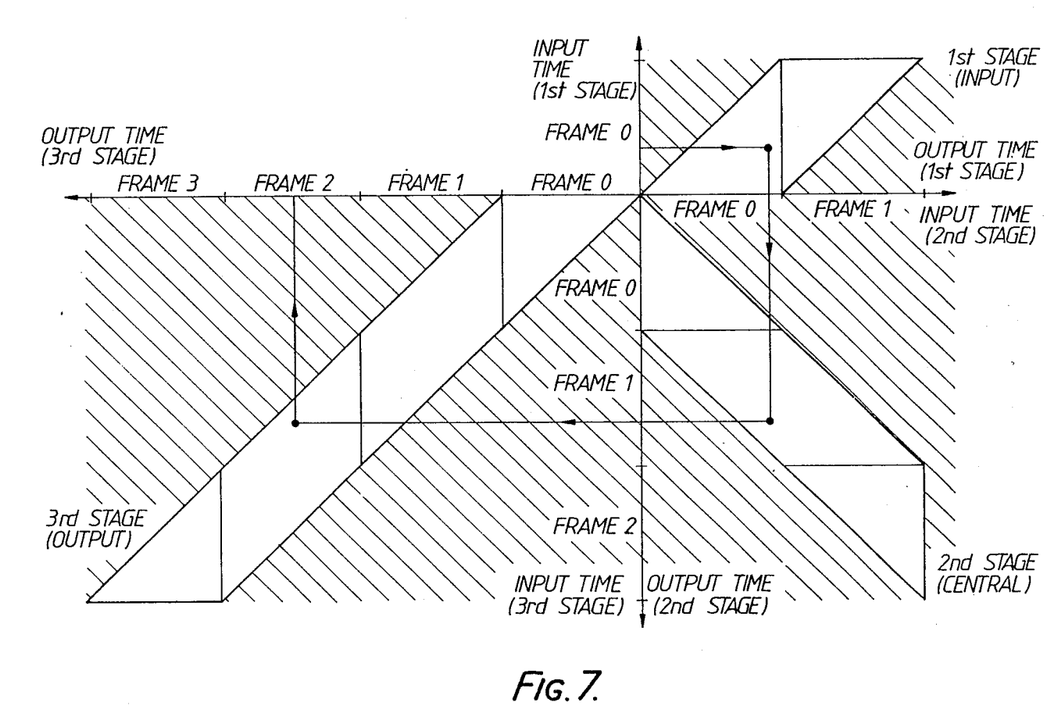
FIG. 7 is a diagram of the time delay arising across all three stages of a switching network.

The switch structure is composed of 3 time switching stages. Being single buffered each stage has a transfer function as shown in FIG. 6. Two sample connections are shown; X TS 8 to TS 24 and Y TS 25 to TS 14. Since connection Y has crossed a frame boundary it experiences an extra whole frame of delay compared with connection X. With straight cascading of 3 such transfer functions there would be 4 possible values of whole frame delay for connections across the switch i.e. 0,1,2 or 3 frames. For a given input to output circuit connection there is a variation of 3 whole frame delay values; dependent on the choice of path routing through the switch. In FIG. 7 three time switching transfer functions have been combined to show the overall transfer function of a general switch with three time switching stages. Each separate stage of transfer function is rotated clockwise by 90 degrees relative to the previous stage; thus the output axis of one stage becomes the input axis for the next stage. For three time switching stages there is a rotation of 270 degrees from the input axis to the output axis for the total switch. From this graphical representation of the switching delay it is easy to track the delays for paths across the switch as shown in the sample connection of FIG. 7.

Figure 8:
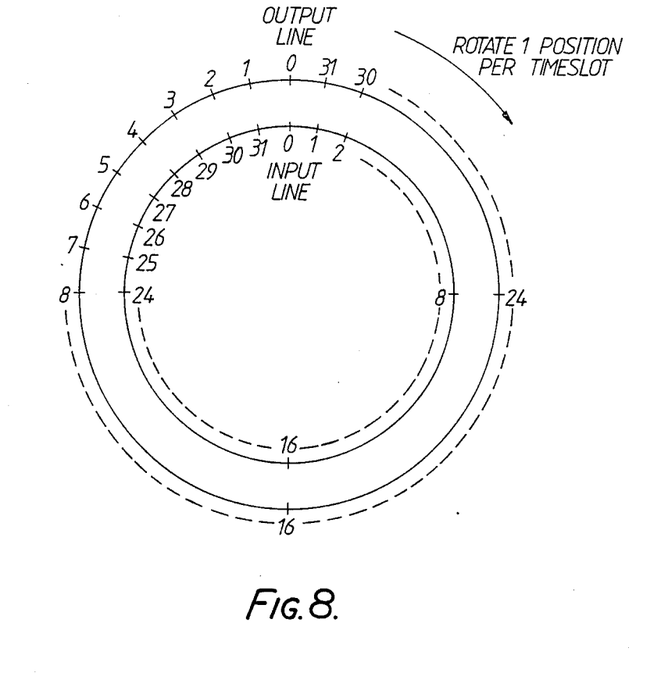
FIG. 8 is a diagram illustrating the cyclic nature of the transfer function of a DMR.

The transfer function shown in FIG. 7 would be correct for a three stage structure in which DSM devices were directly connected without the use of DMR devices between the stages. When DMR devices are used between time switching stages constraints are placed on the relationship of the input and output channels connecting to the central stage. The actual relationship imposed depends on the DMR transfer function chose. FIG. 8 shows how the DMR transfer function used may be represented graphically as a backwards rotation between input lines and output lines, as though it was a 32 way rotary switch. The input line number increases in a clockwise direction while the output line number increases in a anticlockwise direction. For each increment in time slot number the output lines are all rotated one position in a clockwise direction relative to the input lines.

Figure 9:
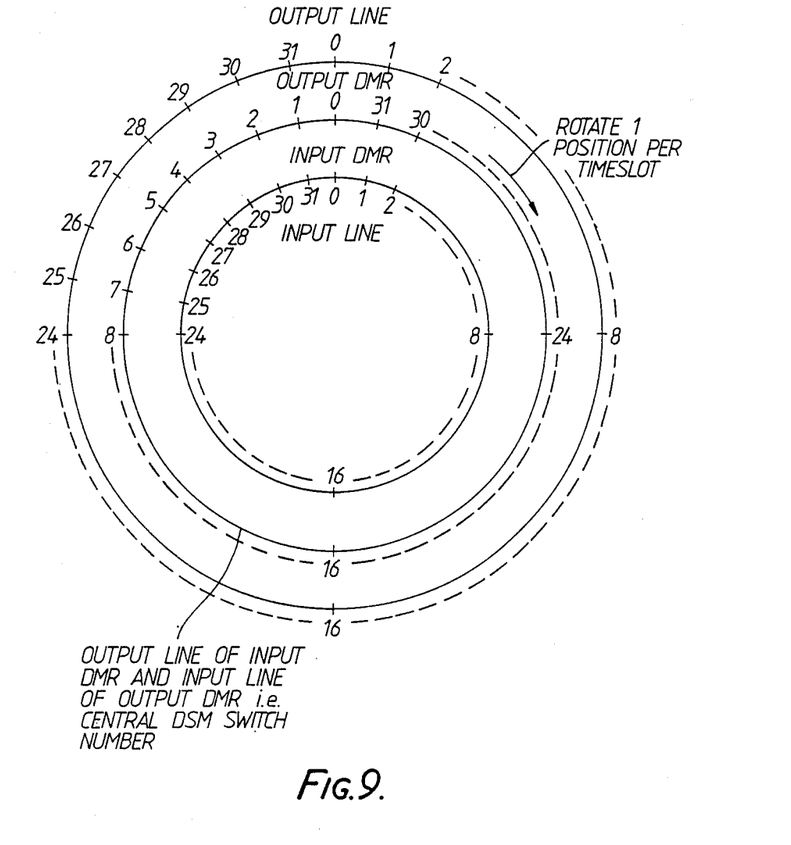
FIG. 9 is a diagram illustrating the transer function of a central switching stage incorporating DMR.

It is necessary to combine the operation of the two DMR stages in order to establish the impact upon the delay across the central switching stage. Referring back to FIGS. 3 and 4 it can be seen that for a required external connection there are 384 possible ways of routing the connection across the central stage. There is one possible path through each of the 384 central DSM switches. From FIG. 4 it can be seen that there are 12 identical super planes in the central stage, each of which contain 32 DSM devices. The DMR device takes 32 channels on one line from the input time switching stage and distributes one channel to each of the central DSM switches. On the output side 32 channels are collected one from each DSM switch for passing onto the output time switching stage. In order to make a connection across a super plane an input channel and an output channel must be chosen such that they are both routed through to the same DSM switch by the the DMR devices. For the 32 possible routings through a super plane there will be a relationship between the input and output channel numbers across the central DSM switch. FIG. 9 combines the operation of the two DMR stages to determine this relationship. The central ring represents both the line number out of the input DMR and the line number into the output DMR; in fact it is really the central DSM number on the super plane. The relationship of the input to output channel numbers will depend upon the relationship of the input to output line numbers, which in turn reflect the input and output time switches. Since the DMR element has 32 input/output lines there will be a cyclic repetition of the transfer function as the input and output time switches are varied over the full 256 plane range. Where the input and output switching planes are the same number or differ by an integer multiple of 32, then by reference to FIG. 9 it can be seen that there is an immediate transfer across the central switching stage i.e. no delay. At the time slot number is increased the connection will be routed by different cnetral DSM switches. Where the input and output switching planes are different then there is no longer an immediate transfer across the central DSM switch and it is necessary to store the data in the central switch until it can be transferred to the output time switch. A connection across the central stage must always go into and out of the same central DSM. Thus switched data will enter a given central DSM as defined by the input DMR transfer function. The data will be stored in the central DSM until it can be transferred across the output DMR to the correct output DSM switch. Since the spacing between the central stage super plane input and output line numbers is constant then it does not matter which central DSM switch is used because they will all need to store the data for the same number of time slots and hence impart the same delay.

Figure 10:
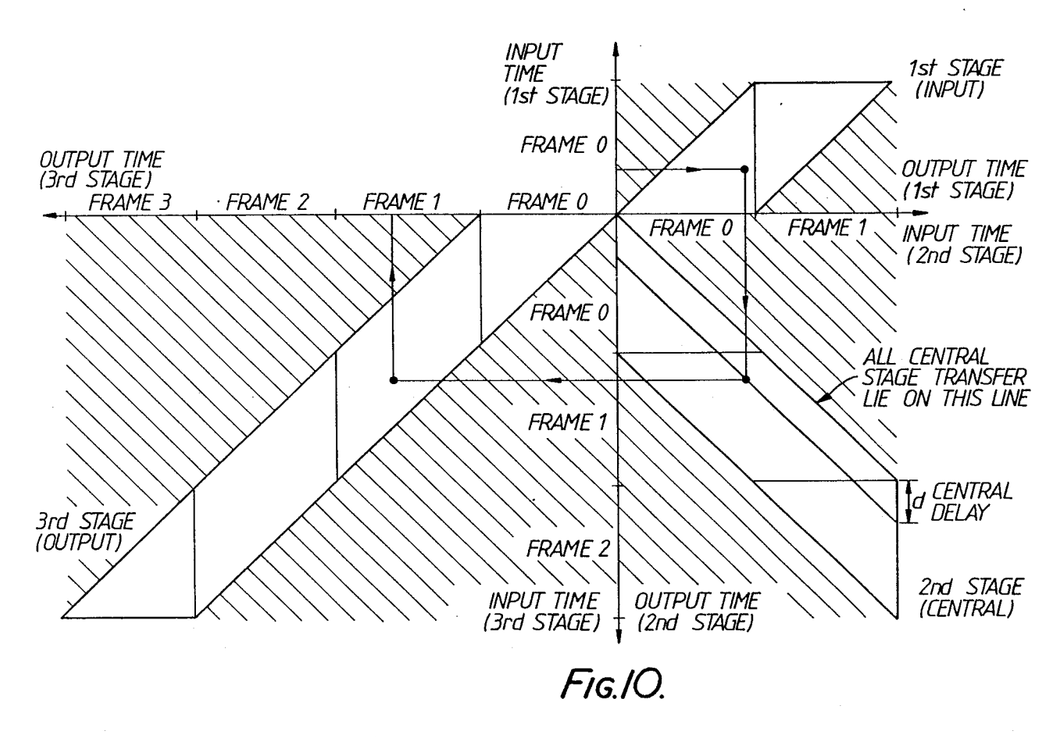
FIG. 10 is a diagram of the time delay arising across a switching network having a central stage incorporating DMR.

Since all super planes operate identically it can be seen that the time slot delay across the central stage will be the same value for all the 384 possible routings of a switch connection. This has the impact of reducing the overall whole frame delay variance by one frame. For a connection across the switch there will only be two different delay values, rather than three that would exist if an arbitrary DMR transfer function had been chosen. In FIG. 10 it is shown how the overall delay transfer function can be modified to reflect this constant delay across the central stage. The central stage transfer function is represented by a diagonal line. The position the diagonal line represents the time slot delay value across the central stage.

Figure 11:
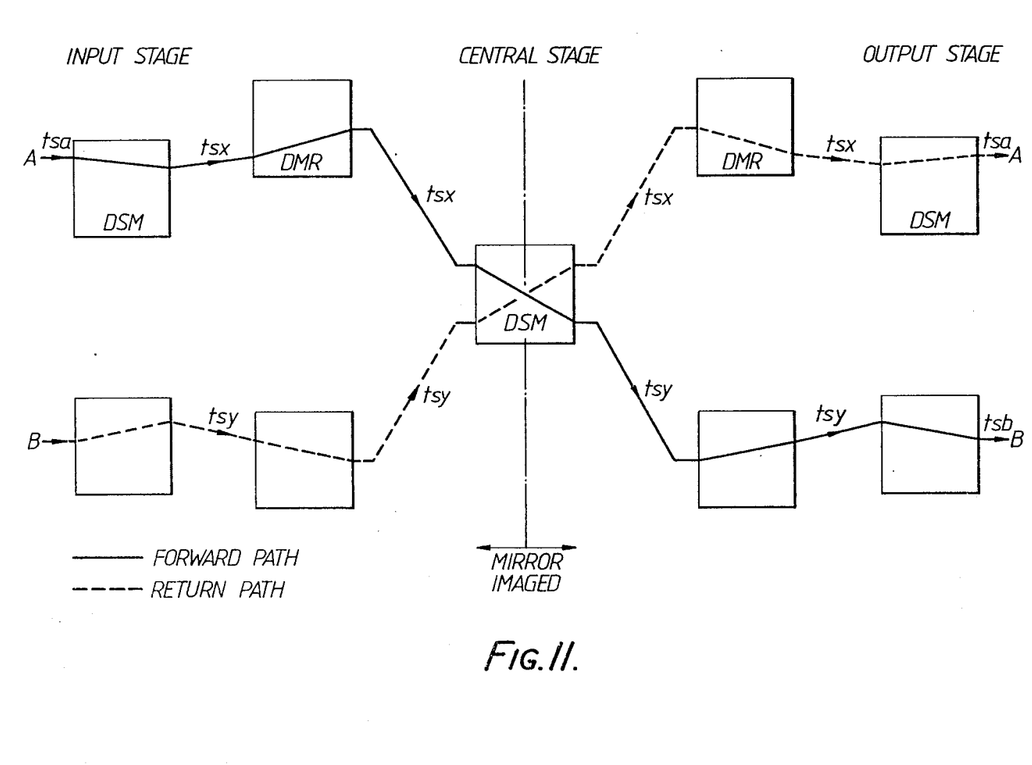
FIG. 11 is a block diagram of duplex communication paths set up across a 3 stage switch.

So far only one direction of switched circuit paths have been analysed. Most connections across the switch require transfer of data in both directions. The switch is operated as a folded structure in terminating the external 30 channel PCM multiplexes. Within the switch the two directions of transfer are carried by correlated paths, all connections being treated as duplex. Where simplex paths are required such as for tones, then the unwanted return path is disabled. The forward and return paths are carried in different super planes. An odd/even relationship between the super plane numbers is used for the correlation of the two directions of transfer. This avoids the problem of trying to set up both directions of an own outer DSM switch connection through the same central DSM, for which there is only one path available when two are required. Apart from the difference in super planes the forward and return paths are mirror images of each other as shown in FIG. 11. As a result the time switching loop delay is a constant value of three frames. Thus when deriving duplex path delays only one direction needs to be considered since the other direction will be correspondingly fixed. If time slot sequence integrity is correct for the forward direction of transfer of a multi-slot connection, then it will also be correct for the return direction.

When setting up multi-slot connections it is a requirement that each individual path has the same whole frame delay in order to preserve the time slot sequence integrity of the connection. It is a constraint that all channels of a multi-slot connection are carried on one multiplex. If separate multiplexes were employed there could be different delays caused by different physical routing in the transmission network and by different delays across the aligner circuits that synchronise the timing of the input circuits to the switch block. Hence all the constituent channels of a multi-slot connection will enter the switch block via one input stage switch and leave via one output stage switch. From the delay analysis it can be seen that the delay across the central switching stage will be the same fixed value for all the multi-slot octets, making the matching of time switching delays an easier process.

The other problem to be considered is the definition of the input and output time slots that comprise the multi-slot circuit. Bad choice of external channels can make the task of matching the individual octet delays very difficult if not impossible to achieve, resulting in a poor grade of service being offered to such connections, especially under overload conditions.

Figure 12:
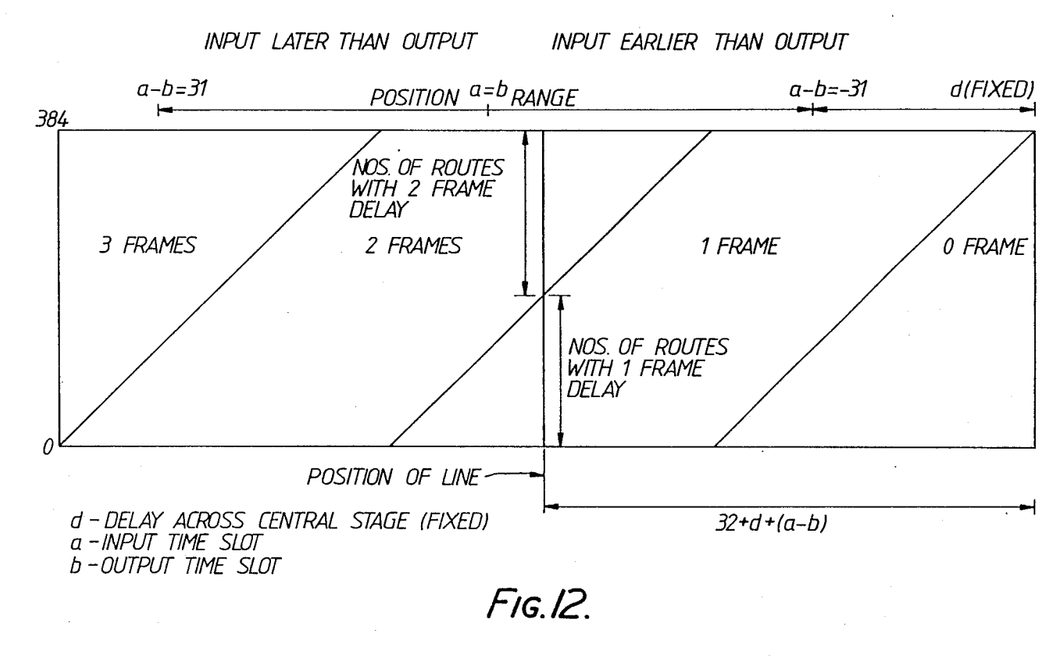
FIG. 12 is a chart showing the number of routes experiencing a given time delay across the switch.

In order to understand the multi-slot octet delay matching more fully it is necessary to analyse how many of the possible 384 central routings having the same overall whole frame delay. FIG. 12 shows a chart which defines the quantity of central routings for the various whole frame delay values. To use this chart it is necessary to fix the position of a vertical line which in general will intersect two delay zones. The length of the line within a delay zone defines the number of central routings that have that particular whole frame delay value. For certain positions of the vertical line there will be only one delay value, making path selection simple. The position of the vertical line is governed by d, the time slot delay across the central stage, and the difference between input time slot, a, and output time slot, b. The value of d is fixed for all the octets of a mutli-slot set up; only a and b will vary. Inspection of the chart shows the importance of making the difference between the input and output time slots as constant as possible. In this manner there will be little difference in the position of the vertical line for the individual octet connections and hence similar allocation of the two different delay values. In the case of complete 2048 kbits/s connections the difference in channel delay is a constant value of 0 time slots; all octet connections have identical input and output time slot values.

Although at the extremes of the delay variation between input and output time slots there is little chance of providing the same delay, the occurrence of such connections is rare and generally there will be a clustering of connections around the $a=b$ position. It can also be seen that delay values of 1 frame or 2 frames are most likely to be chosen. Only in rare cases will it be necessary to use 0 frame or 3 frames.

So far the quantity of central paths with the same whole frame delay has been established. It is now necessary to determine how these central routes with the same delay value are distributed over the actual central switches to gain further insight to the problem of establishing multi-slot connections. In particular it will allow path search algorithms to be established which provide the best grade of service especially when mixed single channel and multi-slot traffic being carried.

Figure 13:
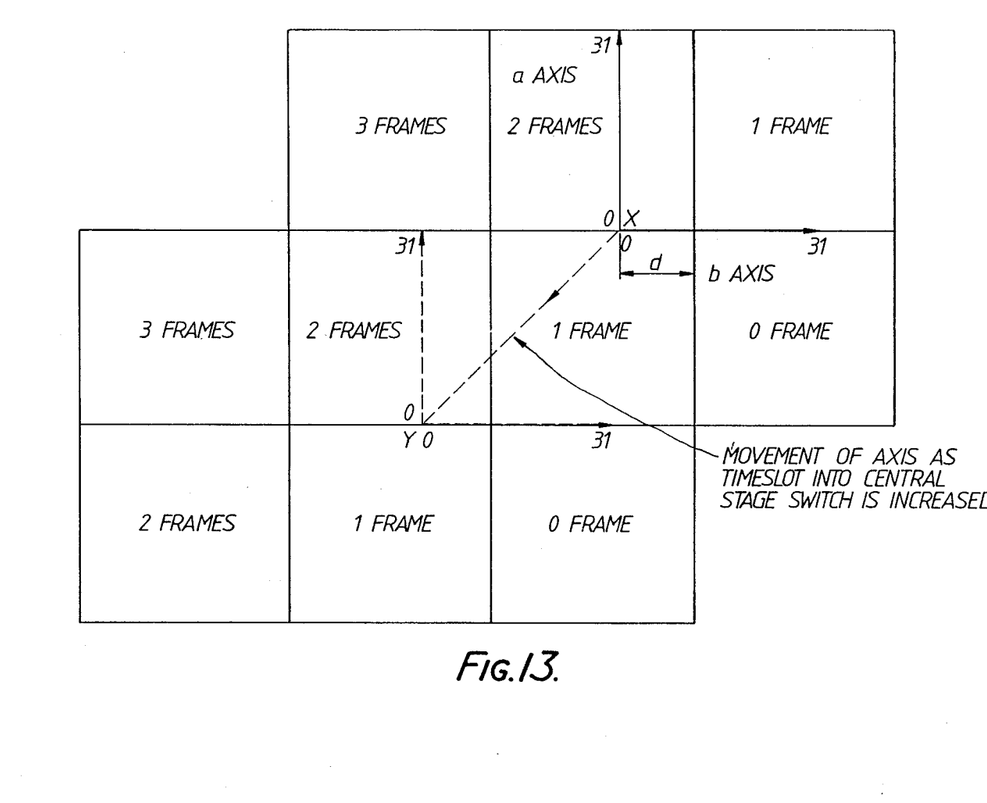
FIG. 13 is a representation of the transfer function of the switch network.

Consider the case of setting up 32 paths across the switch for a complete 2048 kbits/s circuit. All the input and output time slots match for each path, so one vertical line applies to all the connections. There will be the same split in the quantity of central routes which have one frame or two frames deley. However the actual central routes which exhibit a given delay for the various octets will be different. If it was decided to select a one frame delay for the forward direction, then the various octets would experience this delay value on different central routes, avoiding contention during path search. FIG. 13 illustrates how the delay values for the total switch connection vary with central routing. In order to use this chart it is necesary to place a pair of axes in the correct position. The vertical axis, a, represents the input time slot number, while the horizontal axis, b, represents the output time slot number. Initially the origin of the axes is placed at the point X, which puts it d time slots (central switch delay value) into the two frame delay zone. The axes will now be positioned to represent using time slot 0 into the central DSM switch. All the possible combinations of a and b will then have their whole frame delay value represented. In order to use different central routings the origin is moved one time slot position diagonally towards Y for each increase in time slot value into the central DSM switch. Due to the rotating function of the DMR device, different input switches are connected through to the same physical central DSM at different time slots. Thus they will have different points for their origins along the diagonal line that relate to the same central DSM switch. As a consequence different outer switches will be requiring to use difference central switches to set up connections with a given delay value, again avoiding contention.

Within a super plane there will tend to be an even distribution of the use of the the paths through central switches for multi-slot connections. Each super plane provides an identical set of central routes as far as path delays are concerned. The achievement of a non blocking switch with only a 50% increase of circuits in the central switching stage relies on the use of fixed start sequential path search. For single circuit paths, hunting starts at the top DSM on super plane 0. It continues with the next DSM on this super plane and so on until all 32 DSMs have been attempted, before proceeding to the next super plane and repeating the process. Multi-slot path search will proceed in a similar manner but will skip over any central routes which do not have the correct delay.

In setting up a multi-slot connection it is necessary to choose the delay value to be used for all the octets. Where there is no variance in input or output time slot delay for all the connections then it is simple to choose the delay value i.e. the one with the greatest number of central routes. If all the paths cannot be set up with this delay value then the minority value will be tried.

Where there is a variance in the input to output time slot delay values then a representative connection is analysed to determine the delay value with the maximum number of central routes. The connections at the extreme limits of the time slot delay variation are tried first to determine as quickly as possible whether an alternative delay value should be used.

As far as the switch block is concerned time slot 0 is treated as another channel and can be switched with the same delay as the traffic channels. The digital line termination function only provides transparency to the spare bits in time slot 0; the synchronisation pattersn are directly imposed on the output. When a frame slip occurs on the input to the switch one whole frame of input will be either repeated or omitted, but the output generation of sync./non sync. patterns on the output circuits will continue without any break in the sequence. This implies that there will be a different frame relationship between the spare bits and traffic channels after a slip has occurred. Nor is the initial relationship guaranteed, since the start up state of the aligner is indeterminate in many cases. Thus where users require full transparency of a structure 2048 kbits/s circuit no reliance can be placed on the frame integrity of the spare bits in time slot 0 and the traffic channels. If such integrity was required when aligners with an extra whole frame of delay would be required which repeated or omitted two whole frames of data when frame slip occurred. This cannot be recommended due the extra transmission delay imparted by the switching nodes and worsened errors or distortion that result when frame slip does occur.

We claim:

1. A telecommunications digital switch for switching channel of time division multiplexed (TDM) signals on a multiplicity of switch input and output paths, the switch comprising:
(2a+1) switching stages where (a) is any integer;
each odd ordered switch stage in the sequence of stages comprising arrays of DSM;
each DSM comprising a digital switching module for selectively switching any channel on m TDM incoming paths each carrying n digital channels to any channel on m TDM outgoing paths each having n digital channels including a control store and a data store, the data store being adapted to receive and store in a cyclic manner the time division multiplex information stream incoming to the module, the control store being adapted to be read cyclically in synchronism with the channel appearance on the outgoing paths and each location of the control stored is adpated to store the identity of the data store location to be connected to the corresponding output path and channel;
each even ordered stage in the sequence of stages comprising arrays of DMR;
each DMR comprising a Demultiplexing/Mixing-/Remultiplexing device comprising n input paths and n output paths, wherein device comprises n multiplexors each having one output and n inputs and each multiplexor providing one discrete output path for the device and each input path is connected to a corresponding input path on each mutliplexor and the multiplexors of the device are adapted to be controlled to connect a selected input path to the corresponding output path in accordance with the address information fed to the multiplexors from a cyclic address generator in the device and the cyclic address generator is preprogrammed with a fixed channel allocation address pattern arranged such that the channels on each input path are distributed equally over the output multiplexors without changing the position of the channels within a multiplex;
wherein each DMR has a transfer function such that a channel of an input line appears on an output line which is related to the input line by means of a backward rotate function, that all channel routes through the respective switching stage experience the same time delay;
the arrangement being such that all or a major part of channel routes through the switch are constrained to have delays such that all channels are displaced to positions within a sequence of (a) subsequent time frames; and
means for setting up a multi-slot connection through the switch wherein all channels of the connection are routed through the switch to routes having delays displacing the channels to the same time frame whereby to maintain the correct channel sequence.

2. A switch as claimed in claim 1 wherein said transfer function of each DMR is such that a time slot p (numbered from zero) in a time frame of q slots appearing on an input line r (numbered from zero), appears on an output line s (number from zero) where:

$$s = \text{MOD}\,(q - r + p),$$

where MOD = Modulo q.

3. A switch as claimed in claim 1 wherein said integer (a) is 2 and the switch comprises input and output switch stages comprising arrays of DSM and a central switching area, the central switching area comprising second, third and fourth switch stages, the second and fourth stages comprising an array of DMR and the third switch stage comprising an array of DSM, such that all channels are displaced to positions within (n) or (n+1) subsequent time frames of the TDM system where (n) is an integer, selected from the range 0, 1, 2.

4. A method of making a multi-slot connection through a digital switch having a multiplicity of switch input and output paths, the multi-slot connection comprising a multiplicity of channels in a single TDM frame, wherein the switch comprises at least (2a+1) switching stages where (a) is any integer, said switching stages including an input switch stage and an output switch stage, each odd ordered switch stage in the sequence of stages comprising an array of DSM, each even ordered switch stage in the sequence of stages comprising an array of DMR;
wherein each DSM comprises a digital switching module for selectively switching any channel on m TDM incoming paths each carrying n digital channels to any channel on m TDM outgoing paths each having n digital channels including a control store and a data store, the data store being adapted to receive and store in a cyclic manner the time division multiplex information stream incoming to the module, the control store being adapted to be read cyclically in synchronism with the channel appearance on the outgoing paths and each location of the control stored is adapted to store the identity of the data store location to be connected to the corresponding output path and channel;
and wherein each DMR comprises a Demultiplexing-/Mixing/Remultiplexing device comprising n input paths and n output paths, wherein the device comprises n multiplexors each having one output and n inputs and each multiplexor providing one discrete output path for the device and each input path is connected to a corresponding input path on each multiplexor and the multiplexors of the device are adapted to be controlled to connect a selected input path to the corresponding output path in accordance with the address information fed to the multiplexors from a cyclic address generator in the device and the cyclic address generator is preprogrammed with a fixed channel allocation address pattern arranged such that the channels on each input path are distributed equally over the output mutliplexors without changing the position of the channels within a multiplex; and, the method comprising:

(1) proprogramming each DMR with a channel allocation address pattern such that all channel routes through each odd ordered stage experience the same time delay whereby all or a major part of the channel routes through the switch have delays such that the channels are displaced to positions within a sequence of (a) subsequent time frames, the sequence beginning from the input time frame or any subsequent time frame; and (2) selecting a route through the 2nd to (2a)th switching stages for the multiplicity of channels wherein each channel experiences the same time slot delay (d), and selecting a whole frame delay for the passage of said channels through the switch from the values of whole frame delay available for said time slot delay.

5. A method according to claim 4 including the step of feeding said multiplicity of channels on a single multiplex line to a single DSM of said input stage, and feeding said channels from a single DSM of said output stage on a single multiplex line.

6. A method of making a multi-slot connection according to claim 4, wherein said whole frame delay is selected as the delay having the greater number of switching routes, and if none of said switching routes is available, said whole frame delay is selected as a delay having a lesser number of switching routes.

7. A method of making a multi-slot connection according to claim 4, wherein the switch comprises an input switch stage and an output switch stage each comprising arrays of DSM, and a central switching area, the central switching area comprising second, third and fourth switch stages, the second and fourth stages comprising an array of DMR an the third switch stage comprising an array of DSM input switching stage and an output switching stage, and wherein all or a major part of the channel routes through the switch have delays such that the channels are displaced to positions within (n) or (n+1) subsequent time frames of the TDM system, where (n) is an integer selected from the range of values 0, 1, 2.

8. A time division multiplex channel redistribution device having n input paths and n output paths for connection in interstage links of a multi-stage telecommunications switching network handling time division multiplexed communications paths and using digital switching modules, wherein the device comprises n multiplexors each having one output and n inputs and each multiplexor provides one discrete output path for the devise and each input path is connected to a corresponding input path on each multiplexor and the multiplexors of the device are adapted to be controlled to connect a selected input path of the corresponding output path in accordance with address information fed to the multiplexors form a cyclic address generator in the device and the cyclic address generator is preprogrammed with a fixed channel on each input path are distributed equally over the output path multiplexers without changing the position of the channels within a multiplex, whereby to provide a transfer function of the device where a time slot p (numbered from zero) in a time frame of q slots appearing on an input line r (numbered from zero), appears on an output line s (numbered from zero), such that:

$$s = \mathrm{MOD}\,(q - r + p),$$

where MOD = Modulo q.

* * * * *